(12) United States Patent
Matsushita et al.

(10) Patent No.: US 11,396,219 B2
(45) Date of Patent: Jul. 26, 2022

(54) DRAIN HOSE AND DRAIN HOSE CONNECTION METHOD

(71) Applicant: Nissan Motor Co., Ltd., Kanagawa (JP)

(72) Inventors: Masaya Matsushita, Kanagawa (JP); Akira Tanoi, Kanagawa (JP); Kazuhide Itou, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 163 days.

(21) Appl. No.: 16/650,996

(22) PCT Filed: Sep. 28, 2017

(86) PCT No.: PCT/JP2017/035204
§ 371 (c)(1),
(2) Date: Mar. 26, 2020

(87) PCT Pub. No.: WO2019/064421
PCT Pub. Date: Apr. 4, 2019

(65) Prior Publication Data
US 2020/0238794 A1  Jul. 30, 2020

(51) Int. Cl.
*B60H 1/32* (2006.01)
*B60H 1/00* (2006.01)
*F24F 13/22* (2006.01)

(52) U.S. Cl.
CPC ....... *B60H 1/3233* (2013.01); *B60H 1/00571* (2013.01); *F24F 13/222* (2013.01); *F24F 2013/227* (2013.01)

(58) Field of Classification Search
CPC . B60H 1/3233; B60H 1/00571; F24F 13/222; F24F 2013/227; F25D 21/14; F25D 2321/14
See application file for complete search history.

(56) References Cited

U.S. PATENT DOCUMENTS

2016/0325604 A1* 11/2016 Jeong ................. B60H 1/00514

FOREIGN PATENT DOCUMENTS

| FR | 2845148 A1 * | 4/2004 | ........ B60H 1/00571 |
|---|---|---|---|
| JP | S44-11021 Y1 | 5/1969 | |
| JP | S57-209417 A | 12/1982 | |
| JP | H05-32037 U | 4/1993 | |
| JP | H11-170853 A | 6/1999 | |
| JP | 2003254473 A | 9/2003 | |

OTHER PUBLICATIONS

Translation of FR2845148 (Year: 2004).*

* cited by examiner

*Primary Examiner* — Joseph F Trpisovsky
(74) *Attorney, Agent, or Firm* — Osha Bergman Watanabe & Burton LLP (57) ABSTRACT

A drain hose includes a hose main body into which a drain pipe is inserted and a circumferential rib formed on an outer peripheral surface of the hose main body to be away from an extremity of the hose main body and extend in a circumferential direction of the hose main body. The drain hose includes an axial rib formed on the outer peripheral surface of the hose main body to be positioned closer to the extremity of the hose main body than the circumferential rib and extend in an axial direction of the hose main body.

11 Claims, 6 Drawing Sheets

DRAIN HOSE AND DRAIN HOSE CONNECTION METHOD

TECHNICAL FIELD

The present invention relates to drain hoses and drain hose connection methods.

BACKGROUND ART

An example of a drain hose that is connected to a drain pipe of an air conditioner is the one disclosed in Patent Literature 1.

An automobile air conditioner described in Patent Literature 1 has a cooling unit for the air conditioner, disposed on the rear side of the dash panel of the vehicle body near the dash panel in the vehicle compartment. This cooling unit has, at its lower end portion, a protruding drain pipe, to which one end portion of a drain hose is fitted and attached. The drain hose extends from the one end portion frontward and downward, and the other end portion of the drain hose passes through a through hole formed in the dash panel and is guided to the outside of the vehicle. The drain hose has a protruding rib on the outer peripheral surface at the one end portion.

CITATION LIST

Patent Literature

Patent Literature 1: Japanese Patent Application Publication No. H11-170853

SUMMARY OF INVENTION

Technical Problem

For the automobile air conditioner described in Patent Literature 1, when performing a process to insert the drain pipe into the insertion portion of the drain hose, an operator is supposed to insert the drain pipe into the insertion portion of the drain hose with his/her fingers (the operator's fingers) holding the protruding rib on the outer peripheral surface of the drain hose. However, it is possible that the stiffness of the drain hose on the extremity side of the rib is not high enough, and the insertion portion of the drain hose is deformed and collapsed, making it difficult to insert the drain pipe smoothly into the insertion portion of the drain hose.

Hence, an object of the present invention is to provide a drain hose and drain hose connection method having improved workability of connecting a drain hose.

Solution to Problem

A first aspect of the present invention is a drain hose including a hose main body into which a drain pipe of an air conditioner is inserted. The drain hose includes a circumferential rib formed on an outer peripheral surface of the hose main body to be away from an extremity of the hose main body and an axial rib formed on the outer peripheral surface of the hose main body to be positioned closer to the extremity of the hose main body than the circumferential rib.

A second aspect of the present invention is a method of connecting a drain hose to a drain pipe of an air conditioner of a vehicle, the air conditioner being located on the front side of a dash panel in the vehicle travel direction. In the method of connecting a drain, an operator reaches the operator's fingers from a rear side in the vehicle travel direction of the dash panel to the front side in the vehicle travel direction of the dash panel through an opening of the dash panel. The operator inserts the drain pipe into the hose main body with the operator's fingers holding the circumferential rib formed on the outer peripheral surface of the hose main body, and the operator checks with the operator's fingers that the axial rib and the identification mark have a positional relationship after correct insertion.

Advantageous Effects of Invention

The present invention improves the workability of connecting a drain hose.

DESCRIPTION OF EMBODIMENTS

Hereinafter, an embodiment of the present invention will be described in detail along with the drawings.

First, a drain hose 10A according to the embodiment of the present invention will be described based on FIGS. 1 to 5.

As illustrated in FIGS. 1 to 5, the drain hose 10A includes a hose main body 11 into which a drain pipe 3 (see FIGS. 5 and 7) of an air conditioner 2 is inserted. The hose main body 11 is made of, for example, a plastic material having a certain hardness and flexibility.

The hose main body 11 has, at its extremity, an insertion portion 14 having a circumferential rib 12 and axial ribs 13A. In the present embodiment, the circumferential rib 12 and the axial ribs 13A are formed integrally (molded integrally) with the hose main body 11. Here, the configuration is not limited to this example, the circumferential rib 12 and the axial ribs 13A may be formed separately (molded separately) from the hose main body 11.

Figure 3:
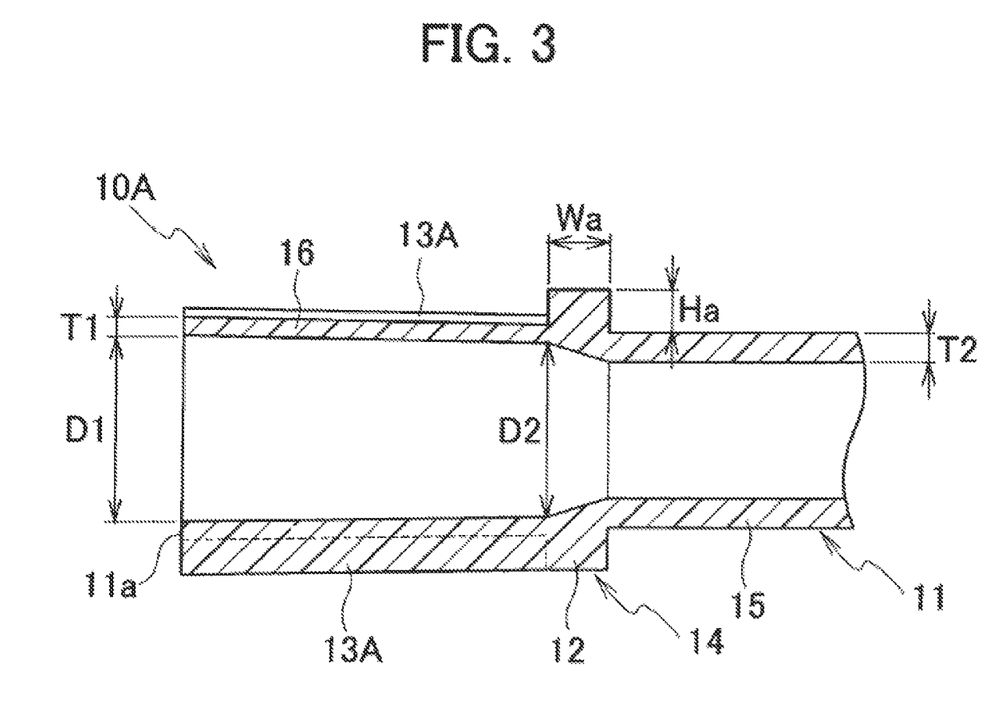
FIG. 3 is a cross-sectional view taken along line A-A in FIG. 2.
Figure 4:
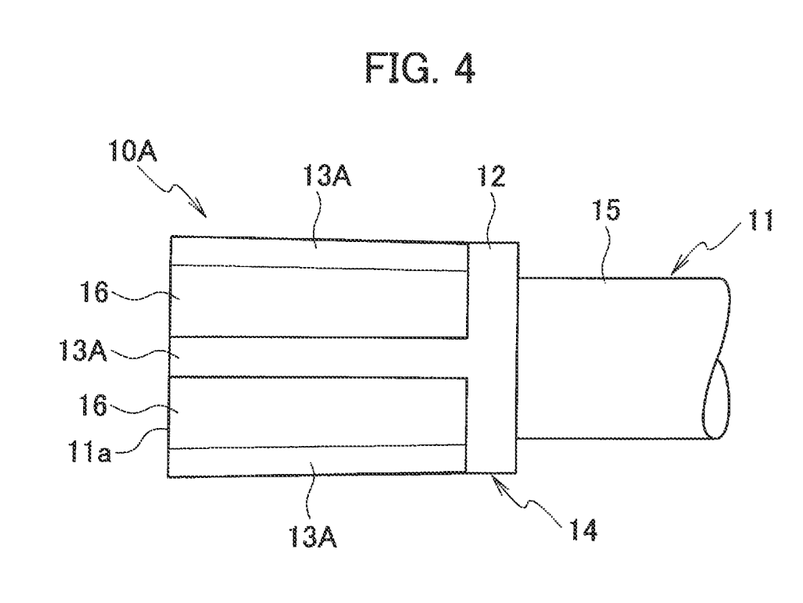
FIG. 4 is a side view of the drain hose according to the embodiment of the present invention.
Figure 5:
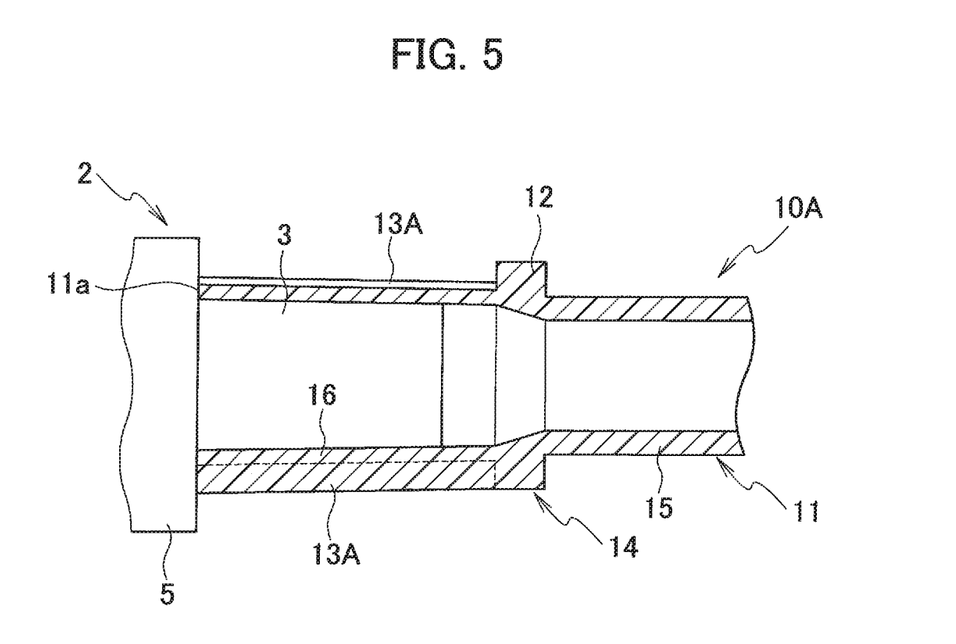
FIG. 5 is a cross-sectional view of the drain hose into which a drain pipe is inserted.

The inner diameter D1 of the insertion portion 14 on the extremity 11a side of the hose main body 11 is larger than the inner diameter D2 of the insertion portion 14 on the circumferential rib 12 side (see FIG. 3). Specifically, the insertion portion 14 is formed to have a tapered shape that is larger toward the extremity 11a side of the hose main body 11.

The circumferential rib 12 is formed on the outer peripheral surface of the hose main body 11 to be away from the extremity 11a of the hose main body 11. The circumferential rib 12 extends in the circumferential direction the hose main body 11. In the present embodiment, the circumferential rib 12 extends over the entire circumference of the hose main body 11. Here, the configuration is not limited to this example, but the circumferential rib 12 may extend only partially in the circumferential direction of the hose main body 11.

As for the circumferential rib 12, the length (rib width) Wa in the axial direction of the hose main body 11 is larger than the length (rib height) Ha in the radial direction of the hose main body 11 (see FIG. 3). In other words, the cross-sectional shape of the circumferential rib 12 has a rectangular shape in which the horizontal width (rib width Wa) is larger than the vertical width (rib height Ha) (see FIG. 3). As for the circumferential rib 12, the horizontal width (rib width Wa) and the vertical width (rib height Ha) are constant along the circumferential direction of the hose main body 11, The axial ribs 13A are formed on the outer peripheral surface of the hose main body 11 to be positioned closer to the extremity 11a side of the hose main body 11 than the circumferential rib 12. The axial ribs 13A extend in the axial direction of the hose main body 11. In the present embodiment, the end portions of the axial ribs 13A on the extremity 11a side of the hose main body 11 extend to the extremity 11a of the hose main body 11, and the end portions of the axial ribs 13A on the opposite side from the extremity 11a side of the hose main body 11 continue to the circumferential rib 12.

Figure 2:
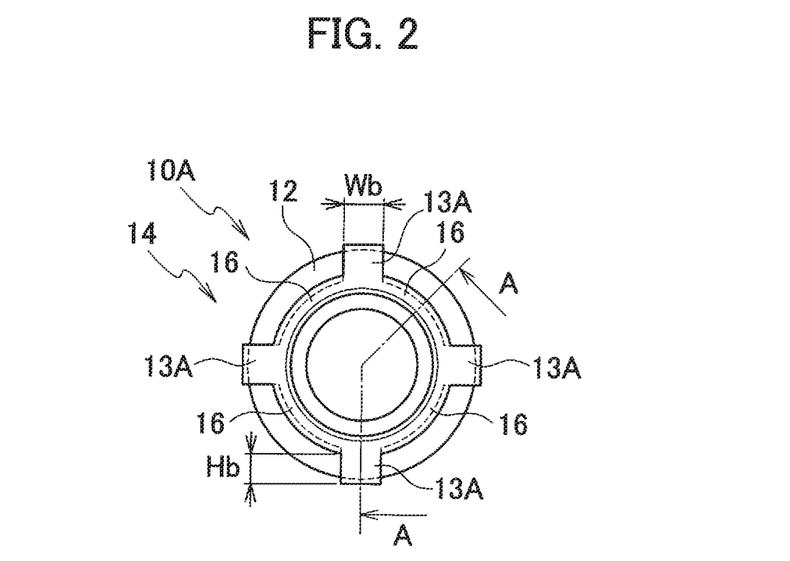
FIG. 2 is a front view of the drain hose according to the embodiment of the present invention.

As for the axial rib 13A, the length (rib width) Wb in the circumferential direction of the hose main body 11 is larger than the length (rib height) Hb in the radial direction of the hose main body (see FIG. 2). In other words, the cross-sectional shape of the axial rib 13A has a rectangular shape in which the horizontal width (rib width Wb) is larger than the vertical width (rib height Hb) (see FIG. 2). As for the axial rib 13A, the horizontal width (rib width Wb) and the vertical width (rib height Hb) are constant along the axial direction of the hose main body 11.

Figure 1:
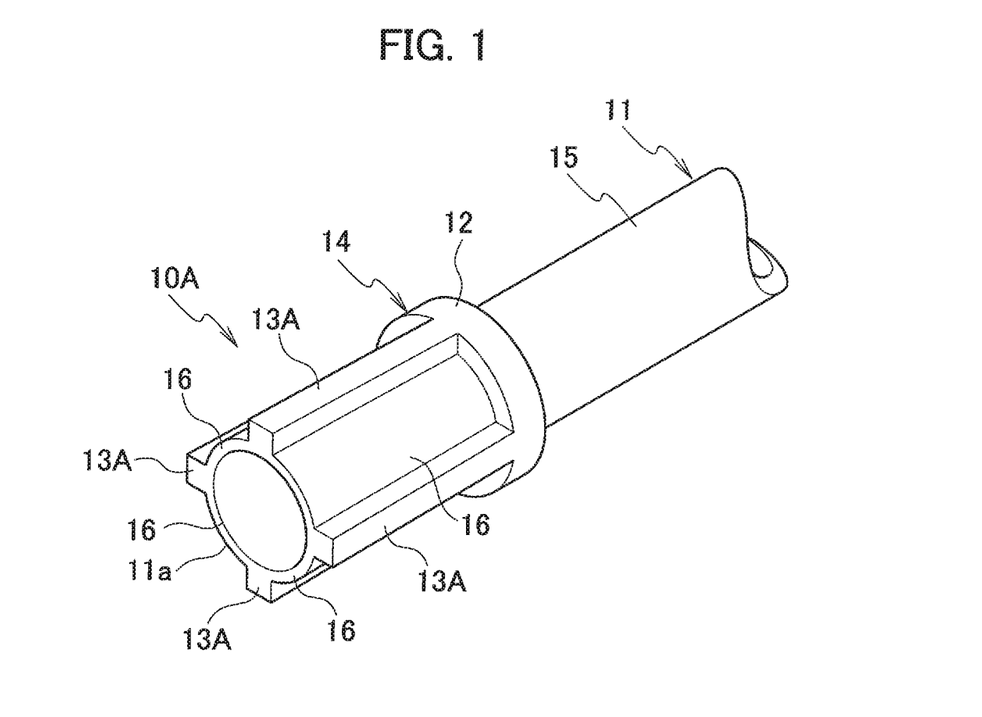
FIG. 1 is an enlarged perspective view of a main part of a drain hose according to an embodiment of the present invention.

The axial ribs 13A, the number of which is larger than one, are spaced in the circumferential direction of the hose main body 11 on the outer peripheral surface of the hose main body 11. In the present embodiment, four axial ribs 13A are spaced equally, in the circumferential direction of the hose main body 11 on the outer peripheral surface of the hose main body 11. The wall thickness T1 of the insertion portion 14 of the hose main body 11 from the extremity 11a of the hose main body 11 to the circumferential rib 12 is smaller than the wall thickness T2 of the regular portion 15 of the hose main body 11 on the opposite side of the circumferential rib 12 from the extremity Ila side (see FIG. 39. Thus, the hose main body 11 has, between the multiple axial ribs 13A, thin-material-thickness portions 16 the wall thickness T1 of which are smaller than the wall thickness T2 of the regular portion 15.

Figure 6:
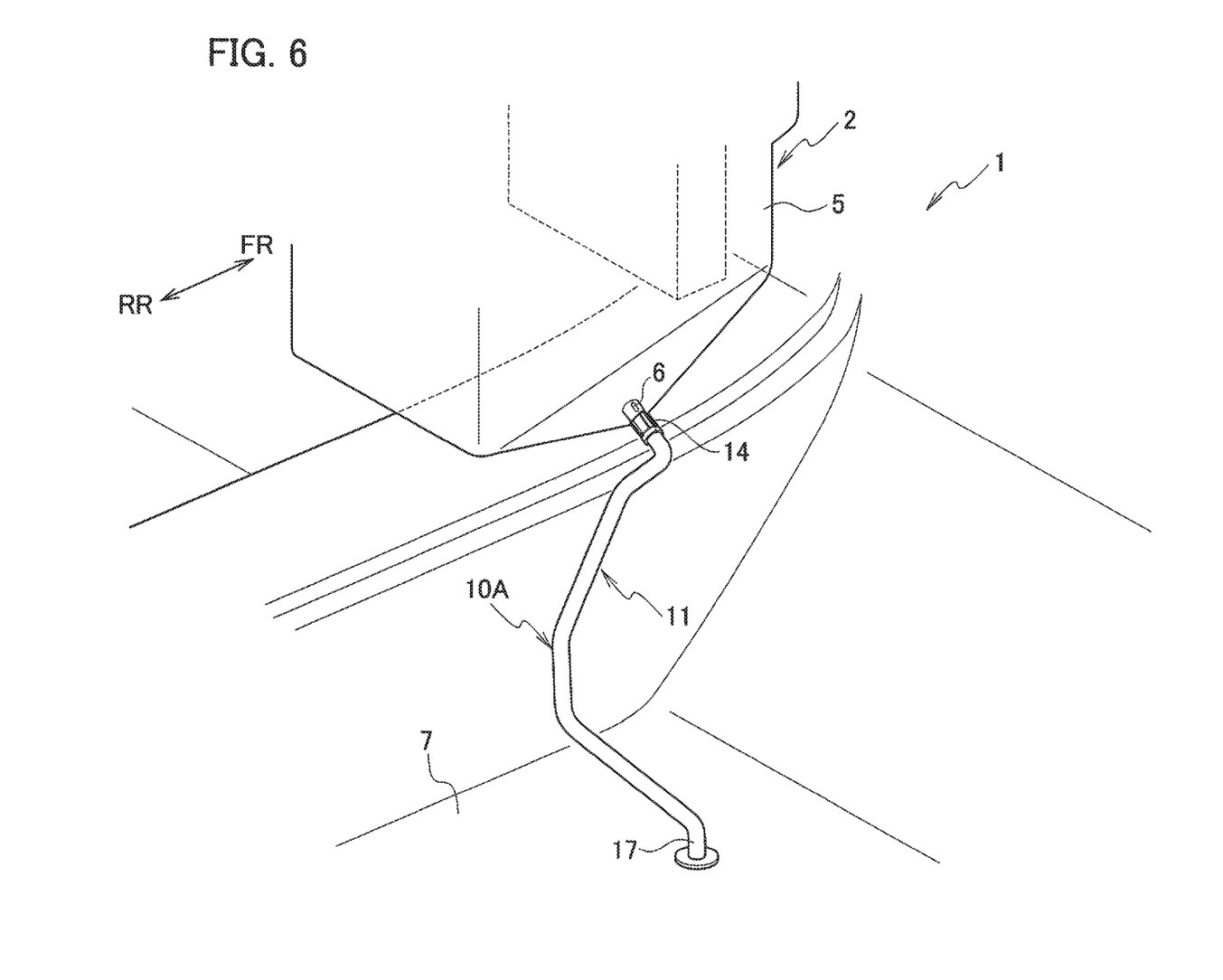
FIG. 6 is a perspective view of an example of a connection structure of a drain hose.

Next, an example of the connection structure of the drain hose 10A will be described based on FIG. 6. Note that in FIG. 6, arrow FR indicates the front side in the vehicle travel direction, and arrow RR indicates the rear side in the vehicle travel direction.

The air conditioner 2 is disposed in a space partitioned by a dash panel 4 (see FIG. 7) of a vehicle 1. The air conditioner 2 is also referred to as a heating, ventilation, and air conditioning (HVAC) unit. The air conditioner 2 includes an evaporator 5, to which a drain pipe 3 (see FIG. 5) is provided for discharging drainage (drainage water) from the evaporator 5. The evaporator 5 has an identification mark 6 formed near the drain pipe 3. The identification mark 6 may be formed, for example, as a recess (dimple) or a protrusion (rib).

The drain pipe 3 is inserted into one end portion (the insertion portion 14) of the drain hose 10A, and the other end portion 17 of the drain hose 10A passes through the floor panel 7 of the vehicle 1 and extends to the outside of the vehicle 1.

Figure 7:
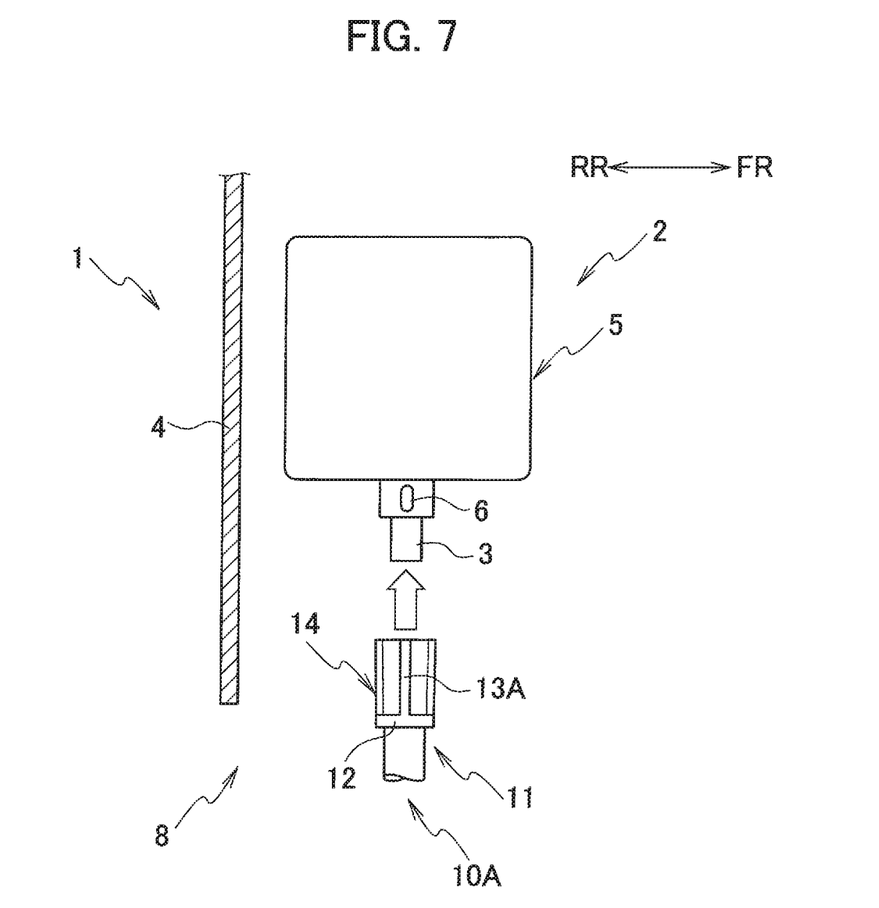
FIG. 7 is a schematic explanatory diagram illustrating an example of a drain hose connection method.

Next, an example of a method of connecting the drain hose 10A will be described based on FIG. 7. Note that in FIG. 7, arrow FR indicates the front side in the vehicle travel direction, and arrow RR indicates the rear side in the vehicle travel direction.

First, an operator reaches the operator's fingers from the rear side in the vehicle travel direction of the dash panel 4 to the front side in the vehicle travel direction of the dash panel 4 through an opening 8 of the dash panel 4. The opening 8 of the dash panel 4 is formed, for example, when a part of the dash panel 4 is removed or when a member other than the dash panel 4 is removed.

Next, the operator holds, with the operator's fingers, the circumferential rib 12 formed on the outer peripheral surface of the hose main body 11 and inserts the drain pipe 3 into the hose main body 11. At this time, of the axial ribs 13A formed in a multiple number in the circumferential direction of the hose main body 11, a specified axial rib 13A is set to be lined with the identification mark 6 in the axial direction of the hose main body 11.

Then, the operator checks with the operator's fingers that the axial rib 13A and the identification mark 6 have a positional relationship after correct insertion.

Hereinafter, operational advantages of the present embodiment will be described.

(1) The drain hose 10A includes the hose main body 11 into which the drain pipe 3 of the air conditioner 2 is to be inserted and the circumferential rib 12 which is formed on the outer peripheral surface of the hose main body 11 to be away from the extremity 11a of the hose main body 11 and extends in the circumferential direction of the hose main body 11. The drain hose 10A includes the axial ribs 13A that are formed on the outer peripheral surface of the hose main body 11 to be positioned closer to the extremity 11a side of the hose main body 11 than the circumferential rib 12 and extends in the axial direction of the hose main body 11.

When the operator applies insertion force with the operator's fingers to the circumferential rib 12 formed on the outer peripheral surface of the hose main body 11, frictional force (insertion resistance) acts on the insertion portion 14 of the hose main body 11 as reaction force. The axial ribs 13A formed on the outer peripheral surface of the hose main body 11 transmits the insertion force applied to the circumferential rib 12 to the axial ribs 13A efficiently. Thus, it is possible to cancel the frictional force and prevent the insertion portion 14 of the hose main body 11 from deforming and collapsing.

Thus, for the drain hose 10A according to the present embodiment, the insertion portion 14 of the drain hose 10A has a high stiffness in the axial direction of the hose main body 11, which improves connection workability of the drain hose 10A.

(2) The axial ribs 13A, the number of which is larger one, are formed on the outer peripheral surface of the hose main body 11 to be spaced in the circumferential direction of the hose main body 11. The wall thickness T1 of the insertion portion 14 of the hose main body 11 from the extremity 11 a to the circumferential rib 12 is smaller than the wall thickness T2 of the regular portion 15 of the hose main body 11 on the opposite side of the circumferential rib 12 from the extremity 11a side.

The thin-material-thickness portions 16 formed at the insertion portion 14 of the hose main body 11 prevent the frictional force from becoming excessively high, thereby preventing the insertion portion 14 of the hose main body 11 from deforming and collapsing.

(3) The end portions of the axial ribs 13A on the opposite side from the extremity 11a side of the hose main body 11 continues to the circumferential rib 12.

The axial ribs 13A formed as above enable the insertion force inputted into the circumferential rib 12 to be transmitted to the axial ribs 13A more efficiently.

(4) The circumferential rib 12 and the axial ribs 13A are formed integrally with the hose main body 11.

The circumferential rib 12 and the axial ribs 13A formed as above contribute to reduction of the part count, compared to the case where the circumferential rib 12 and the axial ribs 13A are formed separately from the hose main body 11. This prevents increase in the production cost of the drain hose 10A.

(5) In the method of connecting the drain hose 10A according to the present embodiment, an operator reaches the operator's fingers from the rear side in the vehicle travel direction of the dash panel 4 to the front side in the vehicle travel direction of the dash panel 4 through the opening 8 of the dash panel 4. The operator holds, with the operator's fingers, the circumferential rib 12 formed on the outer peripheral surface of the hose main body 11 and inserts the drain pipe 3 into the hose main body 11, and then, the operator checks with the operator's fingers that an axial rib 13A and the identification mark 6 have a positional relationship after correct insertion.

As described earlier, when the operator applies insertion force with the operator's fingers to the circumferential rib 12 formed on the outer peripheral surface of the hose main body 11, frictional force acts on the insertion portion 14 of the hose main body 11 as reaction force. The axial ribs 13A formed on the outer peripheral surface of the hose main body 11 transmits the insertion force applied to the circumferential rib 12 to the axial ribs 13A efficiently. Thus, it is possible to cancel the frictional force and prevent the insertion portion 14 of the hose main body 11 from deforming and collapsing.

Hence, even in the case where the drain pipe 3 of the air conditioner 2 is located at a position that cannot be seen from the operator as in the present embodiment, it is relatively easy to connect the drain hose 10A to the drain pipe 3 without the insertion portion 14 of the hose main body 11 deforming and collapsing.

In short, in a method of connecting the drain hose 10A according to the present embodiment, the insertion portion 14 of the drain hose 10A has a high stiffness in the axial direction of the hose main body 11, which improves connection workability of the drain hose 10A.

[Other Embodiments of Present Invention]

Next, drain hoses 10B and 10C according to other embodiments of the present invention will be described based on FIGS. 8 and 9.

Figure 8:
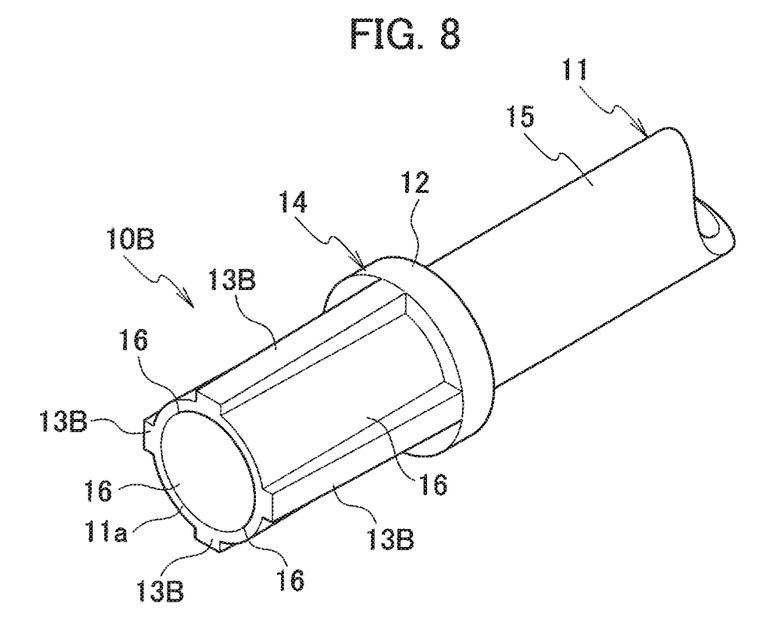
FIG. 8 is an enlarged perspective view of a main part of a drain hose according to another embodiment of the present invention.
Figure 9:
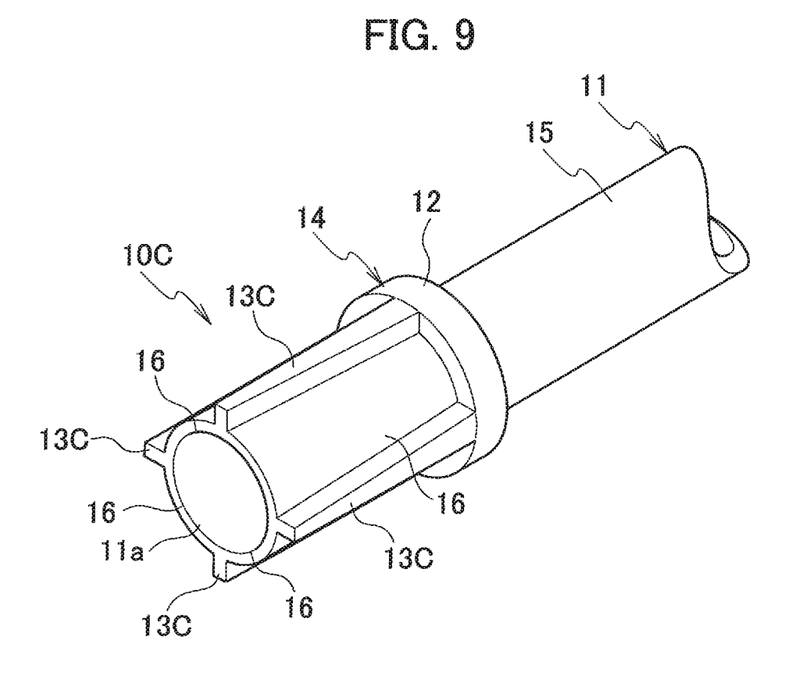
FIG. 9 is an enlarged perspective view of a main part of a drain hose according to another embodiment of the present invention.

For the drain hoses 10B and 10C illustrated in FIGS. 8 and 9, the stiffness of axial ribs 13B and 13C is higher on the circumferential rib 12 side than on the extremity 11a side of the hose main body 11.

For the drain hose 10B illustrated in FIG. 8, the height (rib height) of the axial rib 13B is larger on the circumferential rib 12 side than on the extremity 11a side of the hose main body 11. In other words, the height (rib height) of the axial rib 13B decreases from the circumferential rib 12 side toward the extremity 11a side of the hose main body 11. Meanwhile, the length (rib width) in the circumferential direction of the axial rib 13B is the same on the extremity 11a side of the hose main body 11 and on the circumferential rib 12 side. In other words, the length (rib width) in the circumferential direction of the axial rib 13B is constant along the axial direction of the hose main body 11.

For the drain hose 10C illustrated in FIG. 9, the length (rib width) in the circumferential direction of the axial rib 13C is larger on the circumferential rib 12 side than on the extremity 11a side of the hose main body 11. In other words, the length (rib width) in the circumferential direction of the axial rib 13C decreases from the circumferential rib 12 side toward the extremity 11a side of the hose main body 11. Meanwhile, the height (rib height) of the axial rib 13C is the same on the extremity 11a side of the hose main body 11 and on the circumferential rib 12 side. In other words, the height (rib height) of the axial rib 13C is constant along the axial direction of the hose main body 11.

Hereinafter, operational advantages of other embodiments of the present invention will be described.

(1) The stiffness of the axial ribs 13B and 13C is higher on the circumferential rib 12 side than on the extremity 11a side of the hose main body 11.

Typically, the frictional force generated between the insertion portion 14 of the hose main body 11 and the drain pipe 3 gradually increases as the insertion length becomes larger. The axial ribs 13B and 13C formed as above prevent the frictional force generated between the insertion portion 14 of the hose main body 11 and the drain pipe 3 from becoming excessively large.

(2) The height (rib height) of the axial rib 13B is larger on the circumferential rib 12 side than on the extremity 11a side of the hose main body 11.

Since the axial ribs 13B are formed as described above, the stiffness of the axial ribs 13B are higher on the circumferential rib 12 side than on the extremity 11a side of the hose main body 11 as described earlier. This configuration prevents the frictional force generated between the insertion portion 14 of the hose main body 11 and the drain pipe 3 from becoming excessively large when the drain pipe 3 is being inserted into the insertion portion 14 of the hose main body 11.

(3) The length (rib width) in the circumferential direction of the axial rib 13C is larger on the circumferential rib 12 side than on the extremity 11a side of the hose main body 11.

Since the axial ribs 13C are formed as described above, the stiffness of the axial ribs 13C is higher on the circumferential rib 12 side than on the extremity 11a side of the hose main body 11 as described earlier. This configuration prevents the frictional force generated between the insertion portion 14 of the hose main body 11 and the drain pipe 3 from becoming excessively large when the drain pipe 3 is being inserted into the insertion portion 14 of the hose main body 11.

Although the present invention has been described as above according to the examples, the present invention is not limited to these descriptions, but it is apparent to those skilled in the art that various modifications and improvements are possible.

REFERENCE SIGNS LIST

1 vehicle
2 air conditioner 3 drain pipe
4 dash panel
6 identification mark
8 opening
10 drain hose
11 hose main body
11a extremity
12 circumferential rib
13 axial rib
14 insertion portion
15 regular portion

The invention claimed is:

1. A drain hose comprising:
a hose main body into which a drain pipe of an air conditioner is inserted;
a circumferential rib formed on an outer peripheral surface of the hose main body to be away from an extremity of the hose main body and extend in a circumferential direction of the hose main body; and
a plurality of axial ribs formed on the outer peripheral surface of the hose main body to be positioned between the extremity of the hose main body and the circumferential rib and extend in an axial direction of the hose main body, wherein
the plurality of the axial ribs are formed on the outer peripheral surface of the hose main body to be spaced in the circumferential direction of the hose main body,
an end portion of each of the plurality of the axial ribs on an opposite side from the extremity side of the hose main body continues to the circumferential rib, and
a wall thickness of an insertion portion of the hose main body from the extremity to the circumferential rib is smaller than a wall thickness of a regular portion of the hose main body on an opposite side of the circumferential rib from the extremity.

2. The drain hose according to claim 1, wherein
the stiffness of the plurality of the axial ribs is higher on the circumferential rib side than on the extremity side of the hose main body.

3. The drain hose according to claim 1, wherein
the height of the plurality of the axial ribs is larger on the circumferential rib side than on the extremity side of the hose main body.

4. The drain hose according to claim 1, wherein
the length in the circumferential direction of the plurality of the axial ribs is larger on the circumferential rib side than on the extremity side of the hose main body.

5. The drain hose according to claim 1, wherein
the circumferential rib and the plurality of the axial ribs are formed integrally with the hose main body.

6. A drain hose for connection to a drain pipe of an air conditioner, the drain hose comprising:
a hose main body having an end configured to accept insertion of the drain pipe of the air conditioner;
a circumferential rib formed on an outer peripheral surface of the hose main body at a distance from the end and extending in a circumferential direction around the hose main body; and
a plurality of axial ribs formed on the outer peripheral surface of the hose main body,
wherein the plurality of axial ribs extend in an axial direction of the hose main body from the circumferential rib to the end along the distance; and
wherein the plurality of axial ribs are mutually parallel and are spaced circumferentially around the hose main body,
wherein the hose main body has a first wall thickness between the circumferential rib and the end and a second wall thickness on an opposite side of the circumferential rib, wherein the first wall thickness is smaller than the second wall thickness.

7. The drain hose according to claim 6, wherein the plurality of axial ribs have a first stiffness proximate the circumferential rib and a second stiffness proximate the end, wherein the first stiffness is greater than the second stiffness.

8. The drain hose according to claim 6, wherein the plurality of axial ribs have a first height proximate the circumferential rib and a second height proximate the end, wherein the first height is greater than the second height.

9. The drain hose according to claim 6, wherein the plurality of axial ribs have a first length in the circumferential direction proximate the circumferential rib and a second length in the circumferential direction proximate the end, wherein the first length is greater than the second length.

10. The drain hose according to claim 6, wherein the circumferential rib and the plurality of axial ribs are formed integrally with the hose main body.

11. A method executed by an operator to connect a drain hose to a drain pipe of an air conditioner of a vehicle, the air conditioner being located on a front side of a dash panel in the vehicle travel direction, wherein the drain hose includes:
a hose main body having an end configured to accept insertion of the drain pipe of the air conditioner;
a circumferential rib formed on an outer peripheral surface of the hose main body at a distance from the end and extending in a circumferential direction around the hose main body; and
a plurality of axial ribs formed on the outer peripheral surface of the hose main body,
wherein the plurality of axial ribs extend in an axial direction of the hose main body from the circumferential rib to the end along the distance; and
wherein the plurality of axial ribs are mutually parallel and are spaced circumferentially around the hose main body,
wherein the hose main body has a first wall thickness between the circumferential rib and the end and a second wall thickness on an opposite side of the circumferential rib, wherein the first wall thickness is smaller than the second wall thickness,
the air conditioner has an identification mark formed near the drain pipe of the air conditioner, and
the method comprises:
reaching the operator's fingers from a rear side in the vehicle travel direction of the dash panel to the front side in the vehicle travel direction of the dash panel through an opening of the dash panel;
inserting the drain pipe into the hose main body with the operator's fingers holding the circumferential rib formed on the outer peripheral surface of the hose main body; and
checking with the operator's fingers that the plurality of axial ribs and the identification mark have a positional relationship after correct insertion.

* * * * *